INVENTORS
KENNETH J. KOHNLE
RAYMOND L. AUER
DANIEL M. GREEN, M.D.

BY *Irving Holtzman*

ATTORNEY

United States Patent Office 3,400,185
Patented Sept. 3, 1968

3,400,185
AGGLOMERATION OF SMALLER PHARMACEUTICAL PARTICLES INTO LARGER MICROSPHERULES AND ENTERIC-COATING THEREOF
Kenneth J. Kohnle, Warson Woods, and Raymond L. Auer and Daniel M. Green, St. Louis, Mo., assignors to Bristol-Myers Company, New York, N.Y., a corporation of Delaware
Filed Apr. 8, 1965, Ser. No. 446,636
9 Claims. (Cl. 264—117)

ABSTRACT OF THE DISCLOSURE

Forms microsphere pellets of a pharmaceutically active solid material (e.g., aspirin) which are useful in preparing sustained-release dosage forms having uniform time release characteristics by mixing said pharmaceutically active material and a binder solution in a composite mixing zone comprising a peripheral relatively slow speed mixing section and a central relatively high speed mixing section.

---

This invention relates to a process for forming spherical pellets of pharmaceutically active materials. More particularly, it relates to a process of forming spherical pellets from pharmaceutically active material which are suitable for coating with a variety of coating materials including enteric coating materials. This invention has special application to the formation of "microspherules" and the coating of the same with coating materials, such as enteric coating materials. As used herein, the term "microspherules" means spherical pellets which have a particle size of the order of about 16-30 mesh.

With the advent of sustained release or other time release dosage forms for pharmaceutically active material, a need arose for a process which could prepare relatively uniform "microspherules" of these materials. These were important since the control of the time for release of the drug was dependent on the coating that was applied to the drug particle. If the particles coated were uniformly spherical, the amount of coating material applied to each "microspherule" could be more readily controlled, whereas this was not possible with irregularly shaped non-uniform particles.

One of the efforts made to overcome this problem involved using, as a nucleus, a sugar particle which was coated with the active ingredient. This in turn was ordinarily coated with a sustained-release material. However, the disadvantage of having a product which was too bulky was inherent in this process. The dosage of active material, such as aspirin, that was needed in the particle, together with the inert sugar nucleus, gave a particle which was unduly large.

It is accordingly an object of the present invention to provide a process for preparing spherical pellets of pharmaceutically active material.

It is a further object of the present invention to provide a process of the type mentioned in the above object for preparing spherical pellets of pharmaceutically active materials which are then coated with a pharmaceutically acceptable coating material.

It is also an object of the present invention to provide an economical and dependable process for preparing "microspherules" of pharmaceutically active materials in which a high percentage of the particles produced are spherical in character.

It is still a further object of the present invention to provide a process for preparing "microspherules" of the above-mentioned type which are relatively uniform in contour and which do not require a nucleus of non-pharmaceutically active material and which may be uniformly coated with a pharmaceutically acceptable coating material.

Other and more detailed objects of this invention will be apparent from the following description and drawings wherein.

It has now been found that spherical pellets of high uniformity may be made from pharmaceutically active material by agglomerating said material in a composite mixing zone which is divided roughly into a peripheral relatively low speed mixing section and central relatively high speed mixing section using a liquid binder as the agglomerating or granulating agent. The spherical pellets formed from this procedure may then be coated with a suitable coating in any desired manner. In this manner a high percentage of the particles produced are "microspherules."

Figure 1:
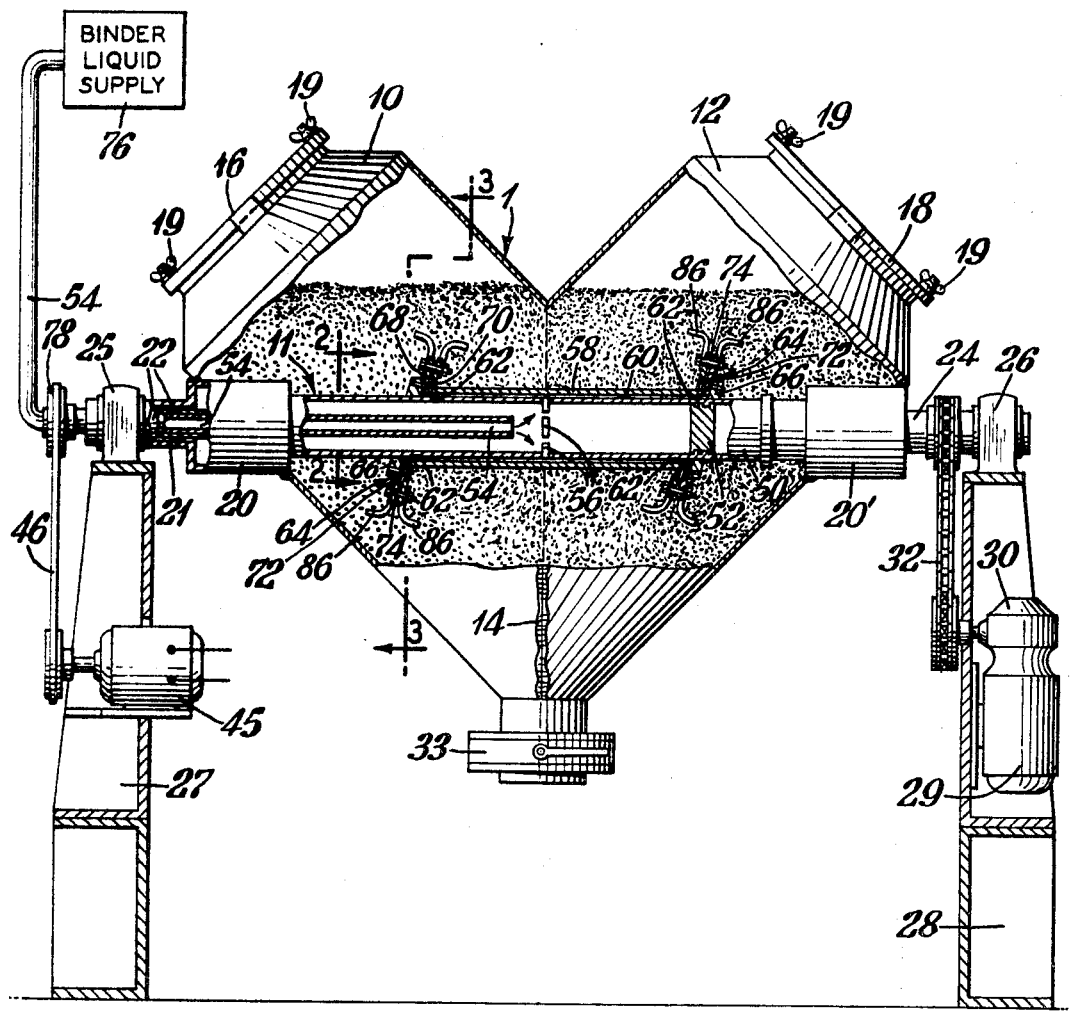
FIGURE 1 is a side elevation of a solid liquid blender useful in carrying out the process of the present invention with portions broken away to show the interior thereof.
Figure 2:
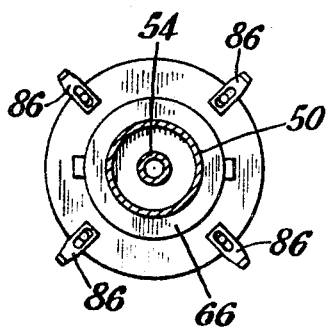
FIGURE 2 is a cross-sectional view taken along the line 2—2 in FIGURE 1 of the intensifier bar assembly.

The agglomerating or granulating operation of the present invention is best performed in the so-called "Patterson-Kelly Twin Shell Liquids-Solids Blender" of the type shown in FIGURE 1 of the drawings. Referring to FIGURE 1, which illustrates such a blender or tumbling mill, the mill comprises a hollow V-shaped container 1 having opposite side leg portions 10–12 of frustoconical cylindrical form disposed with their cylinder axes intersecting at approximately 90° and welded together as indicated at 14.

The outer ends of the cylinder portions 10–12 are closed by end plates 16, 18 which are detachably mounted thereon as indicated at 19 to facilitate loading the machine with feed materials and/or cleaning out the machine, or the like. The V-shaped container is fitted at its opposite sides with axially aligned cylindrical housings 20–20' which mount upon stub shafts 22–24 which are in turn carried with trunnion bearings 25–26 upon frame or pedestal portions 27–28 at opposite ends of the mill.

As shown in FIGURE 1, the housing 20' is welded to the container shell 12 and the stub shaft 24 is keyed or otherwise fixed to the housing 20' so that the mill container and the shaft 24 are integrally connected together. Housing 20 is similarly welded to shell 10. Means for driving the shaft 24 may be supplied in any preferred form, and as illustrated in the drawing, for example, a motor 29 and speed reducer 30 are mounted on the pedestal 28 and connected to the shaft 24 by means of a sprocket and chain system as indicated at 32. Thus, operation of the motor 29 will cause the mill to rotate upon the bearings 26 and 25 (as described in more detatil below), whereupon the material loaded within the mill will be subjected to a thorough admixing action. A discharge spout and control valve as indicated at 33 is conveniently provided at the apex of the mill container structure to facilitate dumping of the finished batches of material.

In accordance with the present invention the material to be blended within the rotating mill is subjected to a so-called peripheral mixing that is accomplished by the rotation of the V-shaped mill. In addition the material is also subjected to central mixing and wetting which is effected by the intensifier bar assembly shown generally at 11. Intensifier bar 11 is keyed to stub shaft 22 which is rotatably mounted within cylindrical housing 20. Accordingly, any rotation of stub shaft 22 is transmitted to intensifier bar 11.

Housing 20 is rotatably mounted upon the pedestal bearing 25 by means of extension 21 thereof. The stub shaft 22 rotates freely within the housing 20 while the latter rotates in the pedestal bearing 25. A motor indicated at 45 is mounted on pedestal 27 and is geared to the stub shaft 22 by means of a pulley and belt drive mechanism or the like as indicated at 46.

Thus, it will be appreciated that operation of the motor at 45 will drive shaft 22 and intensifier bar assembly 11 to rotate interiorly of the mill independently of rotation of the latter upon trunnion bearings 25-26.

The intensifier bar 11 comprises an inner hollow cylinder 50 into which is inserted plug 52. Plug 52 serves to retain and deflect liquid which is introduced in cylinder 50 by means of liquid feed line 54. Cylinder 50 is also provided with a plurality of slits 56 cut through the wall thereof and equally spaced around its circumference. These function as an outlet for liquid introduced into cylinder 50 as described in more detail below.

Disposed around the central portion of inner cylinder 50 and spaced therefrom is outer hollow cylinder 58. This is of greater diameter than inner cylinder 50 and forms with the outer surface thereof a liquid distributing space 60. Outer cylinder 58, near each end thereof is provided with a plurality of perforations 62. These are equally distributed around the circumference of cylinder 58 and serve as outlet for liquid introduced into space 60.

Space 60 is closed off at each end thereof by a liquid dispensing and agitator blade assembly 64. Assembly 64 consists of front ring 66 which fits snugly over inner cylinder 50; a middle ring 68 and a back ring 70. Cut into the surfaces of middle rings 68 and back ring 70 that face each other in the assembly and around their central openings are grooves which together form spaces 72 which are located adjacent the perforation 62 of outer cylinder 58. In assembling rings 68 and 70 their inner faces are also maintained in spaced relationship in any suitable manner and there is thus formed ring-shaped spaces 74 which communicate with spaces 72 and form a continuous path for the flow of liquid from inside of cylinder 50 into the mill containing the material being treated.

Also secured to middle ring 68 and back ring 70 in any suitable manner are agitator blades 86. These function to give the central mixing section described in more detail below.

The binder solution, as noted above, is introduced into cylinder 50 by means of liquid feed tube 54. In the preferred form of this invention the liquid is conveyed by means of a pump (not shown) from liquid supply tank 76. Liquid feed tube 54 passes through the center of pulley wheel 78 and hollow stub shaft 22 and extends to about the middle of cylinder 50.

In using the system described above in accordance with the present invention the V-shaped mill 1 is charged with the material to be pelletized. The particle size will vary. In a typical case the material will be of the order of about 60 to 120 mesh. Motor 29 is then energized and mill 1 begins to revolve on an axis through the center of trunnions 25 and 26. Motor 45 is also energized which causes intensifier bar assembly 11 together with agitator blades 86 to also rotate about said axis. Intensifier bar assembly 11 is preferably rotated in the same direction as mill 1. However, it rotates more rapidly. In general, mill 1 will rotate at a rate of between 12 to 30 r.p.m., whereas intensifier bar 11 will rotate at the rate of between 1000 to 2500 r.p.m. In a preferred form of the invention, however, mill 1 rotates at 24 r.p.m., whereas intensifier bar assembly 11 rotates at 2200 r.p.m.

The material to be pelletized is subjected to a pulverizing action until all the material is reduced to a uniform particle size. The time to effect this will vary with the material employed and the rate of operation. In general, however, this will usually take between 5 and 30 minutes.

The binder solution is pumped from binder solution supply tank 76 through liquid feed line 54 and into cylinder 50. Plug 52 prevents the liquid from running out the end of cylinder 50. The centrifugal force caused by the rapid rotation of cylinder 50 causes the binder solution to move toward the inner wall of cylinder 50 where it leaves the cylinder by means of slits 56 and enters into space 60. The liquid in space 60 finds its way to the ends thereof and exits into space 72 through opening 62 and then through space 74 into the material to be pelletized. In general, space 74 is between 0.005" and 0.020." In a preferred form of the invention, however, the space is 0.010".

The introduction of the binder solution is continued until it is thoroughly dispersed in the material to be pelletized. The amount of binder solution added will also vary with the quantity and type of material treated. In general, however, the amount of binder will be in the range of about 2 to 10% of material being treated.

The liquid feed is then discontinued and the mill 1 and, intermittently, the intensifier bar 11 are kept in motion until the spherical pellets are formed having the proper size. This will vary from case to case, depending on the final results desired. Generally, however, they will be of the order of 16 to 30 mesh (microspherules size).

The pelletized material may be used as such or may be transferred to a coating pan as described in more detail below.

Figure 3:
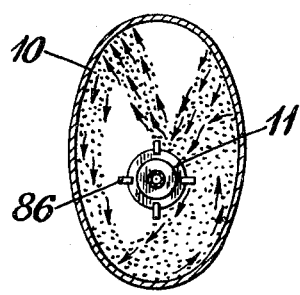
FIGURE 3 is a diagrammatic illustration taken along line 3—3 of FIGURE 1 showing the nature of the material flow and mixing and the action of the intensifier bar thereon.

The action of the composite mixing zone employed in the present invention is best understood with reference to FIGURE 3. As shown therein, the mill (illustrated in part by leg 10) rotates at a relatively slow speed and provides a continuous tumbling and infolding of large masses of the material load. Because of the V-shape of the mill, when it moves from a position where the apex of the V points downwardly to a position where the V is inverted, the bulk of the material is divided between the two legs of the V. When the V is turned right side up again, the material in the legs is mixed together in the apex of the V. In this fashion infolding is obtained. In addition, the sliding action of the bulk of the material as shown by the arrows at the right side of FIGURE 3 illustrates another mode of mixing of the bulk of the material in the mill. The material rises, falls and circulates in the direction of the arrows. These modes of mixing taken together are illustrative of what is referred to herein as peripheral mixing.

Central mixing as used herein is illustrated by the action of the agitator blades 86. As illustrated, FIGURE 3, the bulk of material is conveyed upwardly at the right and circulates and flows downwardly toward the intensifier bar assembly 11. The material that is engaged by the agitator blades 86, which are rotating at a much more rapid rate than mill 1, is rapidly picked up and thrown free of the main body of the material and circulates downwardly toward the left as shown in the drawings. Thus, the operation of intensifier bar assembly 11 produces a very extensive mixing action which aids in producing a high percentage of spherical pellets in accordance with this invention. The above described action of the intensifier bar assembly 11 is illustrative of the central mixing referred to herein.

As mentioned above, the pelletized material made in accordance with the present invention may be coated with a suitable coating material. For this purpose the pellets are transfered to the coating pan where they are first tumbled and dried and screened to the proper size. Any of the well-known coating pans may be used for this purpose. Of particular utility is the Stokes stainless steel coating pan, modified with baffles which are at a 90° angle at the 9 o'clock position to the flow of material and which are positioned at 3, 6, 9 and 12 o'clock positions. These baffles are generally triangular in cross section and extend to within 1–2 inches from the center of the coating pan and serve to keep the pellets tumbling inside the pan during the rotation thereof.

The screened pellets having the proper size, e.g., 16–30 mesh, are then coated in the coating pan. In a preferred form of the invention, the coating material is automatically and alternately spray by an airless spray gun and dried until the desired coating thickness is achieved. The coated pellets may then be further screened to the proper size.

As noted above, the spherical pellets of the present invention are prepared by using a pharmaceutical binder solution. Any of a variety of solutions of this character may be used for this purpose. They will, however, generally take the form of solutions of such film forming materials as polyvinylpyrrolidone, ethylcellulose, Methocel (methylcellulose), hydroxyethylcellulose, hydrogenated castor oil, polyethylene glycol, gelatin, natural gums, such as acacia, guar and tragacanth, alginic acid derivatives or combinations of these binders.

The solvent portion of the binder solutions also may be selected from a wide variety of solvents. Typical solvents included such things as ethyl alcohol, isopropyl alcohol, acetone, methylene chloride, chloroform, methyl ethyl ketone, water or a combination of these solvents. The concentration of binder material in binder solution that is employed in accordance with the present invention will depend on the type and quantity of the pharmaceutically active material utilized as well as the type of binder selected. Typically, however, the concentration of the binder solution will be in the range of 10 to 60%.

As noted above, the spherical pharmaceutical pellets prepared in accordance with the present invention may be coated with different coating materials, depending on the purpose for which the pharmaceutical material is to be used. Typical coating materials are the sustained-release or enteric-coating materials. By way of example the following coating materials may be mentioned: hydrogenated castor oil, cellulose acetate phthalate, shellac, ethyl cellulose, Methocel (methylcellulose) or a combination of these materials.

It will be understood that the quantity of coating material applied will, obviously, vary with the particular purpose for which the pellets are to be employed. In the case where sustained release materials are used, the same type of pellets may give different thicknesses of coating depending upon when the active material is designed to be released for action. In the typical case, however, the amount of coating material applied to the pellets, after removal of the solvent will be in the range of about 3 to 15%.

The process of the present invention may be used to prepare microspherules, coated or uncoated, of a variety of pharmaceutically active materials. These include analgesics, stimulants, antihistamines, decongestants, etc. Moreover, combinations of these materials may be made by either preparing them separately and then combining them in the dosage form or they may be mixed together to form composite microspherules of different pharmaceutically active materials.

The final dosage form that the coated, pelletized materials prepared in accordance with this invention may take will vary. They may be placed in capsules, pressed into tablets, suspended in liquid (e.g., gels) or suspended in solids (lozenges), etc.

The following examples are further illustrative of the present invention. It is to be understood, however, that the invention is not limited thereto.

The polymeric materials used in the examples given below have the following characteristics:

Cellulose acetate phthalate

| Chemical composition: | Percent |
|---|---|
| Combined phthalyl, as $C_8H_5O_3$ | 30–40 |
| Free acid, as $C_8H_6O_4$ (maximum) | 6 |
| Combined acetyl, as $CH_3CO$ | 17–22 |
| Moisture (maximum) | 6 |

Polyvinylpyrrolidone, pharmaceutical grade (PVP; plasdone) K-value 29–32

| Specifications: | | |
|---|---|---|
| Nitrogen | percent | $12.6\pm0.4$ |
| Heavy metals | p.p.m | <20 |
| Arsenic | p.p.m | <2 |
| Moisture | percent | <5 |

Methocel

Methocel 60HG, premium, 50 cps. (hydroxypropyl methyl cellulose). However, Methocel 65HG, 70HG, or 90HG, in viscosity ranges of 15–15,000 cps. may also be used in the examples.

EXAMPLE 1

The Patterson-Kelly Twin Shell Blender described above was charged with 80 mesh aspirin powder (9.7 kg.). A 48% solution of polyvinylpyrrolidone in absoute ethyl alcohol was introduced into the revolving mill by means of the pump, liquid feed tube and intensifier bar. With the mill in motion (24 r.p.m.) and with the intensifier bar assembly operating continuously (2200 r.p.m.), additional absolute ethyl alcohol was added in two increments at specific time intervals (10 minutes and 5 minutes) using the pump, liquid feed tube and intensifier bar. Use of the intensifier bar was then discontinued, and the blender was kept in motion for a specific time interval (15 minutes).

The material was transferred to the modified Stokes coating pan, as described above, and dried completely by means of a stream of air at 170° F. with the pan rotating.

The material was screened and the 16–30 mesh spheres were retained for enteric coating.

Mesh analysis of the spheres using Ro-Tap for 15 minutes was as follows.

| Retained on: | Percent |
|---|---|
| 10 mesh | 5.23 |
| 12 mesh | 1.79 |
| 14 mesh | 9.37 |
| 16 mesh | 5.50 |
| 20 mesh | 32.82 |
| 30 mesh | 20.93 |
| 40 mesh | 3.37 |
| 50 mesh | 13.96 |
| 60 mesh | 3.14 |
| 80 mesh | 2.15 |
| Pan | 3.07 |

The 16–30 mesh spheres were returned to the modified coating pan and a solution of enteric-coating material is alternately sprayed into the rotating pan and dried until the desired thickness of coating is achieved. A solution, of cellulose acetate phthalate (4%) and diethyl phthalate (1%) in methylene chloride-acetone (3:2) was used to coat the aspirin-polyvinylpyrrolidone spheres.

Mesh analysis of the enteric coated spheres using Ro-Tap for 15 minutes was as follows:

| Retained on: | Percent |
|---|---|
| 12 mesh | Trace |
| 14 mesh | Trace |
| 16 mesh | 4.5 |
| 20 mesh | 34.5 |
| 30 mesh | 50.5 |
| 40 mesh | 6.0 |
| Pan | 4.0 |

In the following examples the procedure outlined in Example 1 was employed. The quantities and materials employed were varied as indicated in these examples.

EXAMPLE 2

(a) Microspherule formation

| | | |
|---|---|---|
| Aspirin | grams | 970 |
| Polyvinylpyrrolidone | do | 30 |
| Isopropyl alcohol, 99% | ml | 105 |

The polyvinylpyrrolidone is dissolved in 75 ml. isopropyl alcohol. The remaining 30 ml. isopropyl alcohol is used as a flush solution for the system and to further dampen the material for formation of the microspherules.

(b) Coating of microspherules

| | | |
|---|---|---|
| Aspirin-polyvinylpyrrolidone microspherules | grams | 923 |
| Hydrogenated castor oil | do | 77 |
| Chloroform | ml | 750 |

The hydrogenated castor oil is dissolved in the chloroform and the resulting solution is sprayed onto the microspherules.

EXAMPLE 3

(a) Microspherule formation

| | | |
|---|---|---|
| Caffeine, anhydrous | grams | 950 |
| Polyvinylpyrrolidone | do | 50 |
| Water | ml | 90 |

The polyvinylpyrrolidone is dissolved in the water and the solution is used to dampen the caffeine and to form the microspherules.

(b) Coating of microspherules

| | | |
|---|---|---|
| Caffeine-polyvinylpyrrolidone microspherules | grams | 960 |
| Ethyl cellulose | do | 30 |
| Methocel | do | 10 |
| Methylene chloride | ml | 500 |
| Isopropyl alcohol | ml | 500 |

The ethyl cellulose and Methocel are dissolved in the methylene chloride-isopropyl alcohol mixture and the resulting solution is sprayed onto the microspherules.

EXAMPLE 4

(a) Microspherule formation

| | | |
|---|---|---|
| Aspirin | grams | 948.9 |
| Phenylephrine hydrochloride | do | 18.2 |
| Chlorpheniramine maleate | do | 2.9 |
| Polyvinylpyrrolidone | do | 30.0 |
| Ethyl alcohol | ml | 105 |

The polyvinylpyrrolidone is dissolved in 75 ml. ethyl alcohol. The remaining 30 ml. ethyl alcohol is used as a flush solution for the system and to further dampen the material for formation of the microspherules.

(b) Coating of microspherules

| | | |
|---|---|---|
| Aspiring-phenylephrine hydrochloride - chlorpheniramine maleate-polyvinylpyrrolidone microspherules | grams | 910 |
| Cellulose acetate phthalate | do | 90 |
| Methylene chloride | ml | 600 |
| Acetone | ml | 240 |

The cellulose acetate phthalate is dissolved in the methylene chloride-acetone mixture and the resulting solution is sprayed onto the microspherules.

Although the invention has been described with reference to specific forms thereof, it will be understood that many changes and modifications may be made without departing from the spirit of this invention.

What is claimed is:

1. A process for forming enteric-coated or sustained-release coated microspherules of pharmaceutically active solid materials which comprises introducing into a composite mixing zone particulate pharmaceutically active material of particle size smaller than that of the microspherules desired; said composite mixing zone comprising a peripheral relatively slow speed mixing section and a central relatively high speed mixing section; mixing said particulate material in said composite mixing zone until it is reduced to substantially uniform particle size; introducing pharmaceutically acceptable binder solution into said composite mixing zone containing said particles of uniform size; blending said binder solution and said substantially uniform particles in said composite mixing zone until microspherules of said active material are formed and enteric-coating or sustained-release coating of said microspherules.

2. A process according to claim 1 wherein said binder solution comprises a film forming material in a solvent.

3. A process according to claim 1 wherein the mixing in said peripheral section is effected at a rate of between about 12 and 30 r.p.m. and the mixing in said central section is effected at a rate of between about 1000 and 2500 r.p.m.

4. A process according to claim 1 wherein said particulate pharmaceutically active material has a particle size of the order of about 60 to 120 mesh and said microspherules have a mesh size of the order of about 16–30 mesh.

5. A process for forming enteric-coated or sustained-release coated microspherules of pharmaceutically active material which comprises introducing into a composite mixing zone particulate pharmaceutically active material having a mesh size of about 60 to 120; said composite mixing zone comprising a peripheral relatively slow speed mixing section wherein the mixing is effected at the rate of about 12 to 30 r.p.m. and a central relatively high speed mixing section wherein the mixing is effected at a rate of about 1000 to 2500 r.p.m.; mixing said particulate material in said composite mixing zone until it is reduced to substantially uniform particle size; introducing a pharmaceutically acceptable binder solution of a film forming material into said central mixing section which is capable of binding together particles of said pharmaceutically active material; blending said binder solution and particulate material in said composite mixing zone until microspherules of the order of 16–30 mesh are obtained, coating said microspherules with a solution of an enteric coating material and then drying said coated microspherules.

6. A process according to claim 5 wherein said pharmaceutically active material is aspirin; said binder solution is a solution of polyvinylpyrrolidone in ethyl alcohol and said enteric coating solution is a solution of cellulose acetate phthalate and diethylphthalate in a solvent system of methylene chloride and acetone.

7. A process according to claim 5 wherein said pharmaceutically active material is aspirin; said binder solution is a solution of polyvinylpyrrolidone in isopropyl alcohol and said enteric coating solution is a solution of hydrogenated castor oil in chloroform.

8. A process according to claim 5 wherein said pharmaceutically active material is caffeine; said binder solution is an aqueous solution of polyvinylpyrrolidone and said enteric coating solution is a solution of ethyl cellulose and methylcellulose in a solvent system comprising methylene chloride and isopropyl alcohol.

9. A process according to claim 5 wherein said pharmaceutically active material is a combination of aspirin, phenylephrine hydrochloride and chlorpheniramine maleate; said binder solution is polyvinylpyrrolidone in ethyl alcohol and said enteric coating solution comprises a solution of cellulose acetate phthalate in a methylene chloride-acetone solvent system.

References Cited

UNITED STATES PATENTS

| | | | |
|---|---|---|---|
| 2,514,126 | 7/1950 | Fischer | 259—81 |
| 2,677,534 | 5/1954 | Fischer et al. | 259—85 |
| 2,908,487 | 10/1959 | Fischer | 259—25 |
| 2,915,300 | 12/1959 | Fischer | 259—16 |
| 3,079,303 | 2/1963 | Raff et al. | 167—82 |
| 3,081,233 | 3/1963 | Enz et al. | 167—82 |
| 3,084,104 | 4/1963 | Tuerck et al. | 167—82 |
| 3,089,824 | 5/1963 | Wurster | 167—82 |
| 3,155,590 | 11/1964 | Miller et al. | 167—83 |
| 3,341,416 | 9/1967 | Anderson et al. | 167—83 |

LEWIS GOTTS, *Primary Examiner.*

SHEP K. ROSE, *Assistant Examiner.*